(12) United States Patent
Erceg et al.

(10) Patent No.: US 8,320,487 B2
(45) Date of Patent: Nov. 27, 2012

(54) METHOD AND SYSTEM FOR ADAPTATION BETWEEN DIFFERENT CLOSED-LOOP, OPEN-LOOP AND HYBRID TECHNIQUES FOR MULTIPLE ANTENNA SYSTEMS

(75) Inventors: Vinko Erceg, Cardiff, CA (US); Mark Kent, Vista, CA (US); Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 807 days.

(21) Appl. No.: 12/146,093

(22) Filed: Jun. 25, 2008

(65) Prior Publication Data

US 2009/0003475 A1     Jan. 1, 2009

Related U.S. Application Data

(60) Provisional application No. 60/946,181, filed on Jun. 26, 2007.

(51) Int. Cl.
*H04B 7/02* (2006.01)
(52) U.S. Cl. ........ 375/267; 375/260; 375/362; 375/354; 370/203; 370/338; 370/329; 370/252
(58) Field of Classification Search .................... 375/260
See application file for complete search history.

(56) References Cited

U.S. PATENT DOCUMENTS

| | | | | |
|---|---|---|---|---|
| 6,714,286 B1 * | 3/2004 | Wheel | ........................... | 356/5.05 |
| 7,076,514 B2 * | 7/2006 | Erdogan et al. | ............... | 708/323 |
| 7,308,063 B2 * | 12/2007 | Priotti | ........................... | 375/362 |
| 2001/0031647 A1 * | 10/2001 | Scherzer et al. | ............... | 455/562 |
| 2005/0128976 A1 * | 6/2005 | Uehara et al. | .................. | 370/329 |
| 2006/0039495 A1 * | 2/2006 | Chae et al. | ...................... | 375/267 |
| 2006/0221807 A1 * | 10/2006 | Fukuoka et al. | ............... | 370/203 |
| 2007/0071119 A1 * | 3/2007 | Davydov et al. | ............... | 375/260 |
| 2007/0111757 A1 * | 5/2007 | Cao et al. | ....................... | 455/561 |

FOREIGN PATENT DOCUMENTS

| | | |
|---|---|---|
| EP | 1 076 425 | 2/2001 |
| EP | 1 635 495 | 3/2006 |
| EP | 1 780 925 | 5/2007 |
| EP | 1 786 129 | 5/2007 |

OTHER PUBLICATIONS

International Search Report and Written Opinion corresponding to International Application Serial No. PCT/US2008/068182, mailed Jan. 5, 2009.
Choi et al., "An Adaptive Technique for Transmit Antenna Diversity with Feedback." IEEE Transactions on Vehicular Technology, IEEE Service Center, vol. 51, No. 4, Jul. 1, 2002.
International Preliminary Report on Patentability for International Patent Application Serial No. PCT/US2008/068182, mailed Jan. 14, 2010.

* cited by examiner

*Primary Examiner* — Lihong Yu
(74) *Attorney, Agent, or Firm* — Garlick & Markison; Bruce E. Garlick

(57) ABSTRACT

Aspects of a method and system for adaptation between different closed loop, open loop and hybrid techniques for multiple antenna systems may include a transmitting station that enables generation of a plurality of signals that are concurrently transmitted via a communication medium based on a selected one of: full feedback information, reduced quantity feedback information, or no feedback information. The selection may be determined at the transmitting station based on a determined Doppler shift frequency.

27 Claims, 8 Drawing Sheets

METHOD AND SYSTEM FOR ADAPTATION BETWEEN DIFFERENT CLOSED-LOOP, OPEN-LOOP AND HYBRID TECHNIQUES FOR MULTIPLE ANTENNA SYSTEMS

CROSS-REFERENCE TO RELATED APPLICATIONS/INCORPORATION BY REFERENCE

This application makes reference to, claims priority to, and claims the benefit of U.S. Provisional Application Ser. No. 60/946,181, which was filed one Jun. 26, 2007.

This application also makes reference to:
U.S. patent application Ser. No. 11/759,203 filed Jun. 6, 2007; and
U.S. patent application Ser. No. 11/864,611 filed Sep. 28 2007, Each of the above referenced application is hereby incorporated herein by reference in its entirety.

FIELD OF THE INVENTION

Certain embodiments of the invention relate to wireless communications. More specifically, certain embodiments of the invention relate to a method and system for adaptation between different closed-loop, open-loop and hybrid techniques for multiple antenna systems.

BACKGROUND OF THE INVENTION

A multiple input multiple output (MIMO) communication system comprises a transmitter station, which transmits signals via a wireless communications medium utilizing $N_{TX} > 1$ transmitting antennas, and a receiver station, which utilizes $N_{RX} \geq 1$ receiving antennas to receive signals. Such a system may be referred to as an $N_{TX} \times N_{RX}$ MIMO system. By comparison, a communication system, which comprises a transmitter station, which transmits signals utilizing $N_{TX}=1$, and a receiver station, which utilizes $N_{RX}=1$ receiving antennas to receive signals may be referred to as a single input single output (SISO) communication system. The transmitting stations in a MIMO communication system may utilize the plurality of $N_{TX}$ transmitting antennas to concurrently transmit signals, which comprise data received from $N_{SS} \geq 1$ distinct data streams, or spatial streams. In instances, when the transmitting station utilizes space time coding, the $N_{SS}$ spatial codes may be utilized to generate $N_{STS} \geq 1$ space time codes, which may then be utilized to generate signals, which may be concurrently transmitted by the $N_{TX} \geq 1$.

In a MIMO communication system, a plurality of radio frequency (RF) channels may concurrently exist between the transmitting station and the receiving station. For example, each of the concurrently transmitting $N_{TX}$ transmitting antennas may establish an RF channel to each one of the $N_{RX}$ receiving antennas. Each of these channels may be referred to as a spatial channel. Consequently, in an $N_{TX} \times N_{RX}$ MIMO system supports a plurality of $(N_{TX}) \times (N_{RX})$ spatial channels. In MIMO communication systems, which utilize orthogonal frequency division multiplexing (OFDM), a plurality of $f_c$ distinct frequency carriers, or tones, may be utilized within the RF channel bandwidth. Each of the $f_c$ tones may be concurrently transmitted via each RF spatial channel. For example in IEEE 802.11n WLAN systems, which utilize OFDM, $f_c=56$ for 20 MHz bandwidth or $f_c=112$ for 40 MHz bandwidth. Within a given RF spatial channel, each of the tones may be referred to as an RF subchannel. Thus, an $N_{TX} \times N_{RX}$ MIMO system supports a plurality of $(f_c) \times (N_{TX}) \times (N_{RX})$ RF subchannels.

MIMO communication systems may be utilized to increase communication throughput (the rate at which data is communicated as measured, for example, in bits per second (BPS)) and/or to increase communication reliability (as measured, for example, by bit error rate (BER)) relative to SISO communication systems. In instances when $N_{TX}=N_{SS}=N_{RX}$, the MIMO communication system may maximize the aggregate data transfer rate between the transmitting station and the receiving station. In instances when $N_{TX} > N_{SS}$ and $N_{RX} \geq N_{SS}$, the MIMO communication system may increase communication reliability through the utilization of diversity transmission. In a diversity transmission system, data from a given spatial steam may be concurrently transmitted via a plurality of transmitting antennas. In instances when $N_{SS}=1$, the MIMO communication system may utilize diversity maximization.

MIMO communication systems may also achieve diversity transmission through the use of STC techniques such as space time block coding (STBC) or space frequency block coding (SFBC). In MIMO communication systems, which utilize STC, the $N_{SS}$ spatial streams, each of which may comprise a sequence of data symbols, or codewords, are transformed into $N_{STS}$ space time streams. The $N_{STS}$ space time streams may enable the $N_{TX}$ transmitting antennas to transmit signals comprising an aggregate of L codewords over a time duration of $T_{STC}$ time units, where $T_{STC}$ refers to a time duration for STC processing. In an STBC MIMO communication system, a given codeword, or a transformed version of the codeword (for example, a complex conjugate version), may be transmitted multiple times within the $T_{STC}$ time duration with each transmission occurring from a different one of the $N_{TX}$ transmitting antennas.

In order to increase throughput for either data rate maximization or diversity transmission, the transmitter station may attempt to focus the transmitting energy in the direction of a receiver station. The focusing of transmit energy may increase the signal to noise ratio (SNR) of the signals received at the receiver station. By increasing the SNR ratio, the transmitter station may increase the data-carrying capacity of the RF channels, thereby increasing the potential throughput. The transmitter station may focus the transmitting energy by a technique referred to as beamforming. The transmitting station may generate beamformed signals by assessing the characteristics of the propagation path of the RF channels through the wireless communication medium between the transmitting station and the receiving station. The transmitting station may accomplish this assessment through the computation of channel estimates.

In a closed loop MIMO communication system, the transmitter station may compute channel estimates based on feedback information received from the receiver station. The receiver station may compute channel estimates based on signals received from the transmitter station. The computed channel estimates may be referred to as channel state information (CSI). The CSI may be represented as a channel estimate matrix H. The receiver station may communicate the channel estimate matrix H to the transmitter station within the feedback information. The transmitter station may utilize the fed back channel estimate matrix to generate beamformed signals, which are transmitted to the receiver station.

One limitation in closed loop MIMO communication systems is the quantity of feedback information, which is transmitted from the receiver station to the transmitter station represents overhead. The quantity of overhead reduces the available channel capacity for the communication of data. Thus, the overhead may reduce RF channel throughput. The channel estimate matrix H may comprise a plurality of $(f_c) \times (N_{TX}) \times (N_{RX})$ matrix elements, one matrix, $h_{ij}$, element for each RF spatial channel between the $i^{th}$ transmitting antenna at the transmitter station to the $j^{th}$ receiving antenna at the receiver station. In addition, in a MIMO communication system that utilizes OFDM, for each $h_{ij}$ matrix element, there are $f_c$ matrix elements, one for each OFDM tone. In instances when each matrix element is represented by an $n_h$ bit binary word, the quantity of feedback information due to the channel estimate matrix H is $(n_h) \times (f_c) \times (N_{TX}) \times (N_{RX})$ bits.

Closed loop MIMO communication systems may enable the transmitter station to more accurately characterize the propagation path from the transmitter station to the receiver station in comparison to open loop MIMO communications when the transmitter station and the receiver station are stationary. Another limitation in closed loop MIMO communication systems is the tendency for the CSI feedback data to become stale when the transmitter station and/or receiver station are mobile or when surrounding environment is dynamic. In the case of mobility, the motion may cause changes in the characteristics of the propagation path between the transmitter station and the receiver station. In such cases, the transmitter station may end up utilizing CSI, which was previously received from the receiver station, which may no longer provide an accurate representation of the RF channel. Such CSI may be referred to as being stale. The use of stale CSI by the transmitter station for the purpose of generating beamformed signals may result in reduced throughput. However, attempting to compensate for the tendency of CSI staleness by increasing the frequency with which the receiver station transmits updated CSI to the transmitter station increases overhead and reduces available throughput.

In an open loop MIMO communication system, the transmitter station may transmit signals without utilizing feedback information received from the receiving station. Transmitter stations in open loop MIMO communication systems typically utilize STC.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for adaptation between different closed-loop, open-loop and hybrid techniques for multiple antenna systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
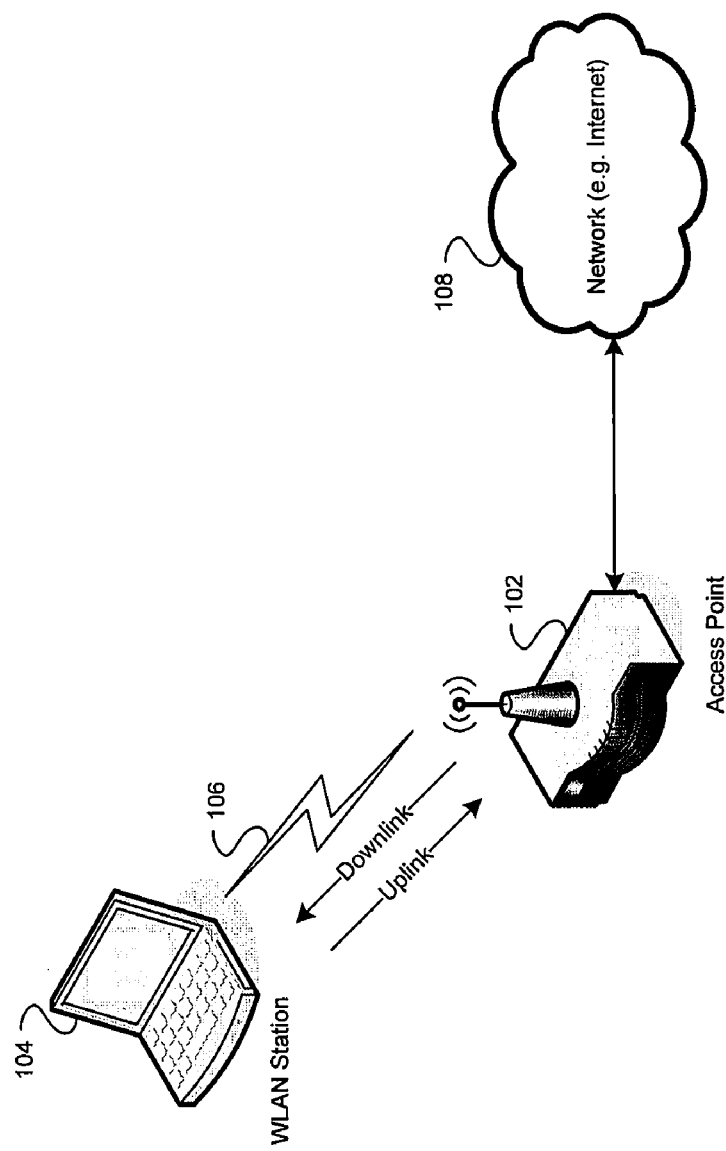
FIG. 1 is an exemplary wireless communication system, which may be utilized in connection with an embodiment of the invention.

Certain embodiments of the invention may be found in a method and system for adaptation between different closed-loop, open-loop and hybrid techniques for multiple antenna systems. Various embodiments of the invention may comprise a method and system by which a transmitter station and a receiver station, in a MIMO communication system, may selectively determine an operating regime under which the transmitter station is to generate signals based on a detected Doppler shift frequency. The selected operating regimes comprise: a) open loop operation, b) closed loop operation and c) hybrid operation.

In open loop operation, the receiver station may not send feedback CSI to the transmitter station. The transmitter station may compute a channel estimate matrix based on signals received from the receiver station, and utilize the computed channel estimate matrix for generating beamformed signals, which are transmitted to the receiver station. Thus, the transmitter station may compute the channel estimates, which are utilized to characterize the propagation path from the transmitter station to the receiver station based on signals, which follow a propagation path from the receiver station to the transmitter station. The transmitter station may generate beamforming weights based on the computed channel estimate matrix. The beamforming weights may be utilized at the transmitter station to enable the generation of the beamformed signals. In various embodiments of the invention, the transmitter station and/or the receiver station may determine a Doppler shift frequency for signals transmitted via RF channels between the transmitter station and the receiver station. For Doppler shift frequencies greater than a threshold value, $D_{open}$, the transmitter station and the receiver station may utilize open loop operation. Alternatively, in open loop operation, the transmitter station may generate space-time coded (STC) signals based on, for example, STBC and/or SFBC, without utilizing computed channel estimates.

In closed loop operation, the receiver station may compute a channel estimate matrix based on signals received from the transmitter station. The receiver station may generate CSI and/or beamforming weights based on the computed channel estimate matrix. The quantity of CSI and/or beamforming weight data may be referred to as full FI and may be represented as $D[FI_{Full}]$. The receiver station may transmit the full FI to the transmitter station within feedback data. The transmitter station may utilize the full FI, in whole or in part, to generate beamformed signals, which are transmitted to the receiver station. In various embodiments of the invention, for Doppler shift frequencies less than a threshold value, $D_{closed}$, the transmitter station and the receiver station may utilize closed loop operation.

In hybrid operation, the receiver station may compute reduced quantity feedback information (FI) based on the computed channel estimate matrix. The reduced quantity feedback information may comprise a reduced quantity of CSI and/or beamforming weight data in comparison to the quantity of CSI and/or beamforming weight data contained within $D[FI_{Full}]$. The reduced quantity FI may be represented as $D[FI_{Reduced}]$. In various embodiments of the invention, $D[FI_{Reduced}] < D[FI_{Full}]$. The receiver station may transmit the reduced quantity FI to the transmitter station within feedback data. The transmitter station may utilize the reduced quantity FI to generate signals, which are transmitted to the receiver station. The generated signals may be generated utilizing beamforming, STC or a combination of beamforming and STC. The transmitter station may compute one or more beamforming weights based on the received reduced quantity FI. In various embodiments of the invention, for Doppler shift frequencies greater than a low threshold value, $D_{closed}$, and less than a high threshold value, $D_{open}$, the transmitter station and the receiver station may utilize hybrid operation.

In various embodiments of the invention, the utilization of hybrid operation may enable the transmitting station to avoid the tendency to generate beamformed signals based on stale FI by increasing the frequency at which reduced quantity FI is transmitted by the receiver station.

FIG. 1 is an exemplary wireless communication system, which may be utilized in connection with an embodiment of the invention. Referring to FIG. 1, there is shown an access point (AP) 102, a wireless local area network (WLAN) station (STA) 104, and a network 108 (for example, the Internet). The AP 102 and the STA 104 may communicate wirelessly via one or more radio frequency (RF) channels 106. The AP may be communicatively coupled to the network 108. The AP 102, STA 104 and network 108 may enable communication based on one or more IEEE 802 standards, for example IEEE 802.11.

The STA 104 may utilize the RF channel 106 to communicate with the AP 102 by transmitting signals via an uplink channel. The transmitted uplink channel signals may comprise one of more frequencies associated with a channel as determined by a relevant standard, such as IEEE 802.11. The STA 104 may utilize the RF channel 106 to receive signals from the AP 102 via a downlink channel. Similarly, the received downlink channel signals may comprise one of more frequencies associated with a channel as determined by a relevant standard, such as IEEE 802.11.

In an exemplary embodiment of the invention, which utilizes closed loop operation, the AP 102 may utilize $N_{TX}=4$ transmitting antennas to transmit beamformed signals to the STA 104 via a plurality of downlink RF channels. The AP 102 may utilize OFDM to generate the transmitted signals. Each RF channel may have a 20 MHz channel bandwidth and may utilize $f_c=56$ tones within the RF channel bandwidth. The STA 104 may utilize $N_{RX}=1$ receiving antennas to receive the signals. The corresponding 4×1 MIMO communication system may comprise 4 RF spatial channels, each of which may comprise 56 subchannels. The STA 104 may compute a channel estimate matrix $H_{down}$ based on the signals received from the AP 102 via the downlink channel. The computed channel estimate matrix may comprise 56×4×1=256 matrix elements. The channel estimate matrix $H_{down}$ may comprise data that characterizes the signal propagation path for signals that are transmitted by the AP 102 and received at the STA 104. The STA 104 may generate CSI feedback data to transmit the channel estimate matrix $H_{down}$ to the AP 102 via an uplink RF channel. In an exemplary instance in which each matrix element in the channel estimate matrix $H_{down}$ is represented by an 8 bit binary word, the quantity of data $D[FI_{Full}]=256$ octets. The STA 104 may also generate beamforming weight data. In such case, the quantity of data $D[FI_{Full}]$ may be determined based on the quantity of data from the channel estimate matrix $H_{down}$ and/or the quantity of data comprising the beamforming weight data. The AP 102 may utilize the received feedback data to generate subsequent beamformed signals, which are transmitted to the STA 104.

Various embodiments of the invention may be practiced in connection with a variety of wireless communication devices, such as laptop computers equipped with a means for wireless communication and/or various mobile handset devices such as smartphone devices, for example.

Figure 2:
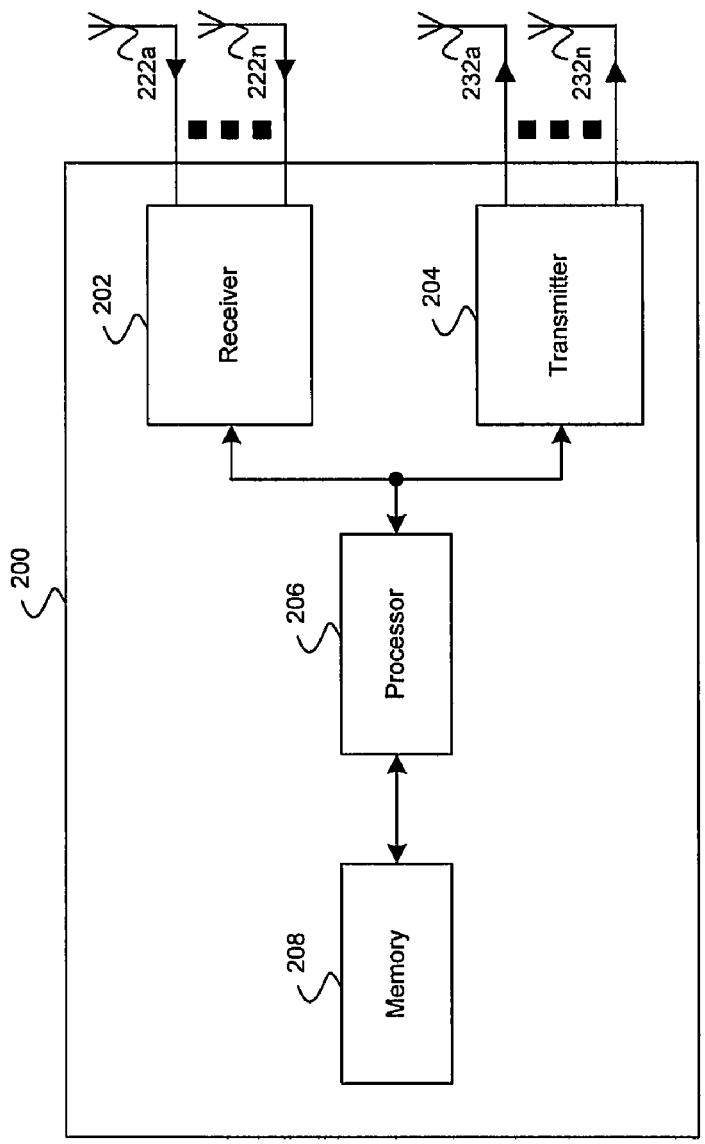
FIG. 2 is an exemplary transceiver, which may be utilized in connection with an embodiment of the invention.

FIG. 2 is an exemplary transceiver, which may be utilized in connection with an embodiment of the invention. Referring to FIG. 2, there is shown a transceiver system 200, a plurality of receiving antennas 222a . . . 222n and a plurality of transmitting antennas 232a . . . 232n (transmitter and receiver may use same antennas). In various embodiments of the invention, an AP 102 and/or STA 104 may each comprise a transceiver system 200, which enables the AP 102 and STA 104 to communicate in a MIMO communication system. The transceiver system 200 may comprise at least a receiver 202, a transmitter 204, a processor 206, and a memory 208. Although a transceiver is shown in FIG. 2, transmit and receive functions may be separately implemented. For example, the AP 102 and/or STA 104 may comprise: a receiver system, which comprises at least a receiver 202, processor 206 and memory 208; and/or a transmitter system, which comprises at least a transmitter 204, processor 206 and memory 208.

In an exemplary embodiment of the invention, the processor 206 may enable digital receiver and/or transmitter functions in accordance with applicable communications standards. The processor may also perform various processing tasks on received data. The processing tasks may comprise computing channel estimates, which may characterize the wireless communication medium, delineating packet boundaries in received data, and computing packet error rate statistics indicative of the presence or absence of detected bit errors in received packets.

In a receiver station, such as STA 104, the processor 206 may enable the computation of CSI feedback information, beamforming weights, and/or reduced quantity feedback information, based on received signals. The processor 206 may also enable the computation of Doppler shift frequencies in received signals. The processor 206 may enable a determination of whether to generate feedback information comprising full FI or reduced quantity FI based on the computed Doppler shift frequency. In a transmitter station, such as AP 102, the processor 206 may enable a determination of whether to utilize feedback information to enable the generation of beamformed signals and/or STC signals.

The receiver 202 may perform receiver functions that may comprise, but are not limited to, the amplification of received RF signals, generation of frequency carrier signals corresponding to selected RF channels, for example uplink channels, the down-conversion of the amplified RF signals by the generated frequency carrier signals, demodulation of data contained in data symbols based on application of a selected demodulation type, and detection of data contained in the demodulated signals. The RF signals may be received via one or more receiving antennas 222a . . . 222n. The data detected by the receiver 202 may be communicated to the processor 206.

The transmitter 204 may perform transmitter functions that may comprise, but are not limited to, modulation of received data to generated data symbols based on application of a selected modulation type, generation of frequency carrier signals corresponding to selected RF channels, for example downlink channels, the up-conversion of the data symbols by the generated frequency carrier signals, and the generation and amplification of RF signals. The data processed by the transmitter 204 may be received from the processor 206. The RF signals generated by the transmitter 204 may be transmitted via one or more transmitting antennas 232a . . . 232n.

The memory 208 may comprise suitable logic, circuitry and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM). In the context of the present application, the memory 208 may enable storage of code for the computation and storage of FI feedback information and/or the computation and storage of channel estimates.

In various embodiments of the invention, the transceiver system 200 may utilize a set of antennas, which may be utilized by the transmitter 204 and by the receiver 202. In an exemplary transceiver system 200 utilized for time division duplex (TDD) communications, the transceiver system 200 may comprise a transmit/receive switch, which enables the set of antennas to be coupled to the transmitter 204, thereby enabling the transceiver system 200 to transmit signals. The transmit/receive switch may alternatively enable the set of antennas to be coupled to the receiver 202, thereby enabling the transceiver system 200 to receive signals. In an exemplary transceiver system 200 utilized for frequency division duplex (FDD) communications, the transmit/receive switch may enable the set of antennas to be concurrently coupled to both the transmitter 204 and the receiver 202, thereby enabling the transceiver system 200 to concurrently transmit and receive signals.

Figure 3:
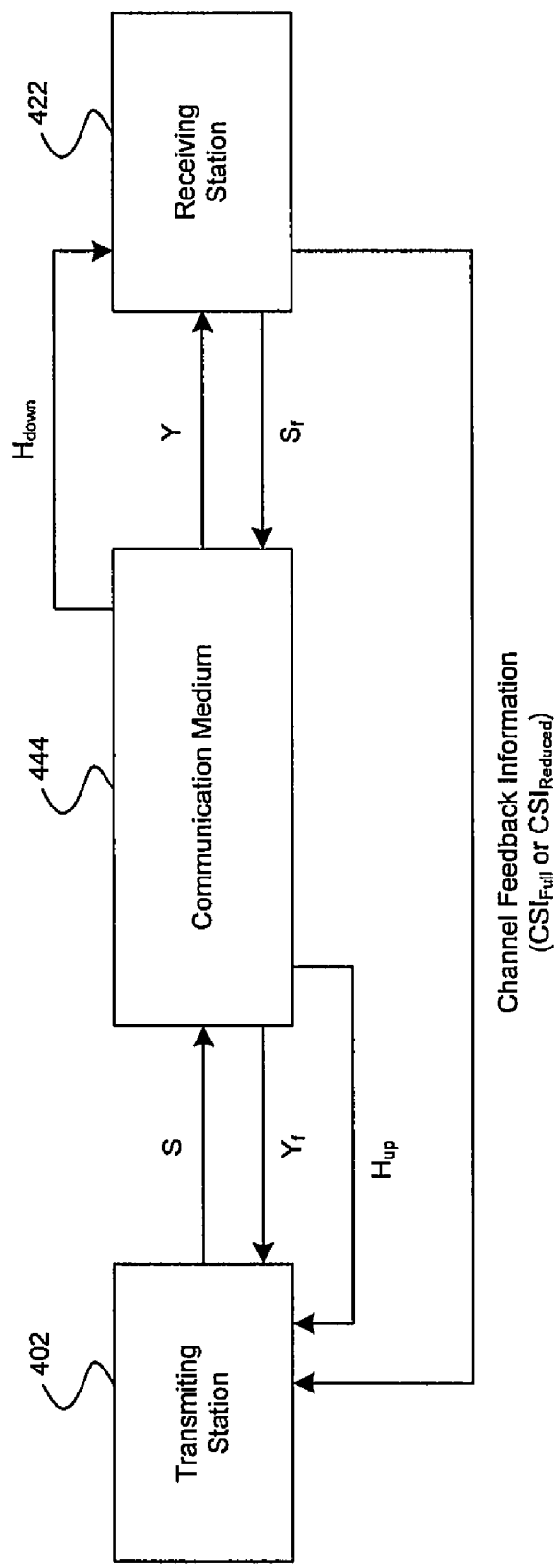
FIG. 3 is an exemplary diagram illustrating channel feedback, which may be utilized in connection with an embodiment of the invention.

FIG. 3 is an exemplary diagram illustrating channel feedback, which may be utilized in connection with an embodiment of the invention. Referring to FIG. 3, there is shown a transmitting station 402, a receiving station 422, and a communications medium 444. The communications medium 444 may represent a wireless communications medium. The transmitting station 402 may represent an AP 102 and the receiving station may represent an STA 104, for example. The transmitting station 402 may transmit a signal vector S to the receiving station 422 via the communications medium 444. The communications direction from the transmitting station 402 to the receiving station 422 may be referred to as a downlink direction. The signal vector S may comprise a plurality of $N_{TX}$ signals simultaneously transmitted via the corresponding plurality of $N_{TX}$ transmitting antennas.

The signal vector S may travel through the communications medium 444. The signal vector S may be altered while traveling through the communications medium 444. The transmission characteristics associated with the communications medium 444 may be characterized by a transfer function. The transfer function may be characterized by a channel estimate matrix H. The signal vector S may be altered based on the transfer function, which is represented by the channel estimate matrix H. In the downlink direction, the channel estimate matrix H may be referred to as $H_{down}$. The altered signal vector S may be represented as the signal Y. The receiving station 422 may receive the signal Y. The receiving station 422 may compute one or more transfer coefficient values, $h_{ij}$, associated with the channel estimate matrix $H_{down}$ based on the signal Y received via the communications medium 444.

The receiving station 422 may compute the channel estimate matrix $H_{down}$. The receiving station 422 may communicate feedback information to the transmitting station 402. In various embodiments of the invention, the feedback information may comprise full FI, $FI_{Full}$, or reduced quantity FI, $FI_{Reduced}$. The receiving station 422 may communicate the feedback information ($FI_{Full}$ or $FI_{Reduced}$) via a transmitted signal vector $S_f$. The transmitted signal vector $S_f$ may be transmitted to the transmitting station 402 via the communications medium 444. The signal vector $S_f$ may be altered while traveling through the communications medium 444. The communications direction from the receiving station 422 to the transmitting station 402 may be referred to as an uplink direction. The signal vector $S_f$ may be altered based on a transfer function. In the uplink direction, the transfer function may be characterized by the channel estimate matrix $H_{up}$. The altered signal vector $S_f$ may be represented as the signal $Y_f$.

In one of the various embodiments of the invention, the receiving station 422 may determine a Doppler shift frequency based on the level crossing rate of the received signal. The Doppler frequency shift results from a nonzero relative velocity difference between the transmitting station 402 and the receiving station 422. In a typical circumstance, the nonzero relative velocity is a result of one station being in motion while the other station is stationary.

In various embodiments of the invention, a computed Doppler shift frequency by the receiving station 422 may be utilized to determine an operating regime by comparing the computed Doppler shift value $D_{RX}$ to threshold values $D_{open}$ and $D_{closed}$. In instances when $D_{RX} \leq D_{closed}$ the receiving station 422 may operate in a closed loop operating regime. When operating in the closed loop operating regime, the receiving station 422 may communicate feedback information $FI_{Full}$ to the transmitting station 402. In instances when $D_{closed} < D_{RX} < D_{open}$ the receiving station 422 may operate in a hybrid operating regime. When operating in a hybrid operating regime, the receiving station 422 may communicate feedback information $FI_{Reduced}$ to the transmitting station 402. In instances when $D_{RX} \geq D_{open}$ the receiving station 422 operate in an open loop operating regime. When operating in an open loop operating regime, the receiving station 422 may not communicate feedback information to the transmitting station 402.

In various embodiments of the invention, the transmitting station 402 may also compute Doppler shift frequencies based on the transmitted signal vector $S_f$. The computed Doppler shift value $D_{TX}$ may be utilized by the transmitting station 402 to determine an operating regime by comparing the computed Doppler shift value $D_{TX}$ to the threshold values $D_{open}$ and $D_{closed}$.

In instances when $D_{TX} \leq D_{closed}$ the transmitting station 402 may operate in a closed loop operating regime. When operating in the closed loop operating regime, the transmitting station 402 may generate beamformed signal vectors S based on feedback information received from the receiving station 422. The feedback information may comprise full FI, $FI_{Full}$. In instances when $D_{closed} < D_{RX} < D_{open}$ the transmitting station 402 may operate in a hybrid operating regime. When operating in a hybrid operating regime, the transmitting station 402 may generate signal vectors S based on feedback information received from the receiving station 422. The feedback information may comprise reduced quantity FI, $FI_{Reduced}$. In instances when $D_{TX} > D_{open}$ the transmitting station 402 may operate in an open loop operating regime. When operating in an open loop operating regime, the transmitting station 402 may generate beamformed signal vectors S based on the channel estimate matrix $H_{up}$ computed at the transmitting station 402. The channel estimate matrix $H_{up}$ may be computed based on the received signal vector $Y_f$.

In various embodiments of the invention, the transmitting station 402 may generate STC signal vectors S when operating in an open loop operating regime. In various embodiments of the invention, the transmitting station 402 may utilize beamforming and STC to generate signal vectors S based on the channel estimate matrix $H_{up}$ when operating in an open loop operating regime.

Figure 4:
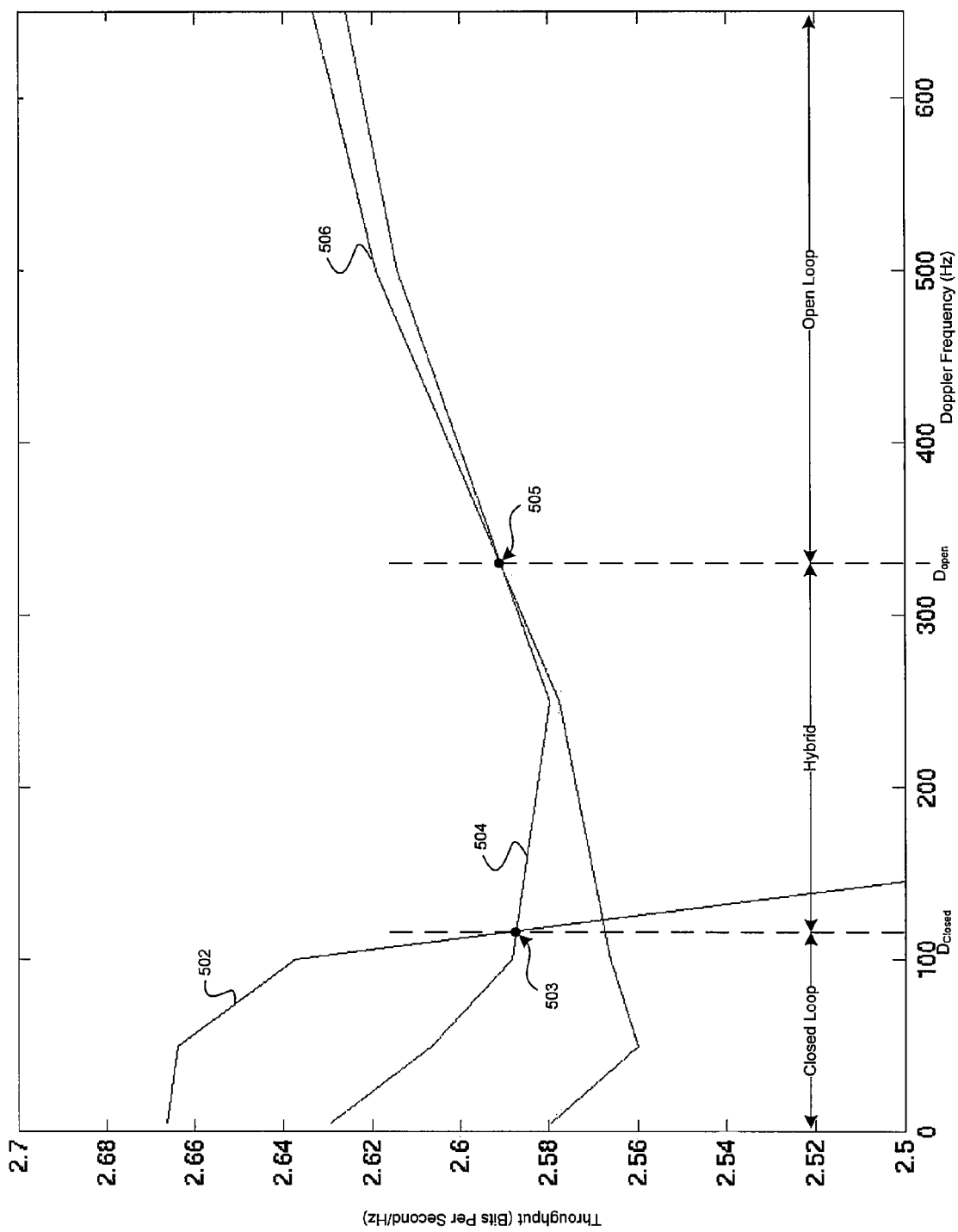
FIG. 4 presents an exemplary diagram for operating regime selection based on Doppler shift frequency, in accordance with an embodiment of the invention.

FIG. 4 presents an exemplary diagram for operating regime selection based on Doppler shift frequency, in accordance with an embodiment of the invention. Referring to FIG. 4, there is shown a set of graphs, which present throughput performance results for a simulated MIMO communication system. The graphs presented in FIG. 4 are presented to illustrate various features of an exemplary embodiment of the invention. Consequently, various embodiments of the invention may be practiced when attributes of the simulation presented in FIG. 4 are modified.

The horizontal axis in FIG. 4 presents Doppler shift values as measured in Hz. The vertical axis in FIG. 4 presents throughput performance as measured in BPS/Hz. The simulated MIMO communication system is an exemplary 4×1 MIMO system in which $f_{center}$=2 GHz. The boundaries of the simulation presented in FIG. 4 provide a simulation of RF channel communications between a node B (an exemplary transmitting station) and a single user equipment (UE) (an exemplary receiving station) in a 3GPP LTE MIMO communication system. The signals transmitted via the simulated RF channels utilize OFDM. Codewords transmitted via the signals are generated utilizing 4-QAM. The data utilized to generate the codewords are generated by utilizing binary convolutional coding (BCC) with a coding rate of 2/3. The SNR as measured at the receiving station is 10 dB. The time delay for communicating feedback data from the receiving station to the transmitting station is 0.75 milliseconds (ms).

In FIG. 4, graph 502 presents exemplary throughput results for the simulated MIMO system when operating in a closed loop operating regime. In the closed loop operating regime, the simulated MIMO system signals are transmitted utilizing beamforming. In the closed loop operating regime, each of the channel estimate coefficients in the channel estimate matrix H is represented as floating point numerical values. Graph 504 presents exemplary throughput results for the simulated MIMO system when operating in a hybrid operating regime. In the hybrid operating regime, the simulated MIMO system signals are transmitted utilizing STC. The feedback information is represented as a one-bit binary value. Graph 506 presents exemplary throughput results for the simulated MIMO system when operating in an open loop operating regime. In the open loop operating regime, the simulated MIMO system signals are transmitted utilizing STC.

In the simulated MIMO system presented in FIG. 4, for the range of Doppler shift values $D \leq D_{closed}$ the throughput performance of the simulated MIMO system is maximized when operating in the closed loop operating regime. At the point 503 highlighted in FIG. 4, $D=D_{closed}$. At point 503, the throughput performance for the simulated MIMO system is about equal to 2.59 BPS/Hz for both the closed loop operating regime and for the hybrid operating regime.

For Doppler shift values $D_{closed}<D<D_{open}$, the throughput performance of the simulated MIMO system is maximized when operating in the hybrid operating regime. At the point 505 highlighted in FIG. 4, $D=D_{open}$. At point 505, the throughput performance for the simulated MIMO system is about equal to 2.59 BPS/Hz for both the hybrid operating regime and for the open loop operating regime. For Doppler shift values $D_{closed}>D>D_{open}$, the throughput performance of the simulated MIMO system is maximized when operating in the hybrid operating regime. For Doppler shift values $D \geq D_{open}$, the throughput performance of the simulated MIMO system is maximized when operating in an open loop operating regime.

In various embodiments of the invention, a transmitting station 402, which is operating in the hybrid operating regime, may generate transmitted signals utilizing STC based on reduced quantity feedback information (FI). In such case, the transmitting station 402 may generate transmitted signals based on an angle rotation value, θ, received from the receiving station 422 within feedback data. In an exemplary embodiment of the invention, the receiving station 422 may transmit feedback information that utilizes a single bit value to specify the angle rotation value, θ. The transmitting station may utilize the received single bit value in connection with quasi-orthogonal STBC or SFBC.

An exemplary method for quasi-orthogonal SFBC and STBC was presented in U.S. application Ser. No. 11/759,203 filed Jun. 6, 2007, which is hereby incorporated herein by reference in its entirety.

Figure 5:
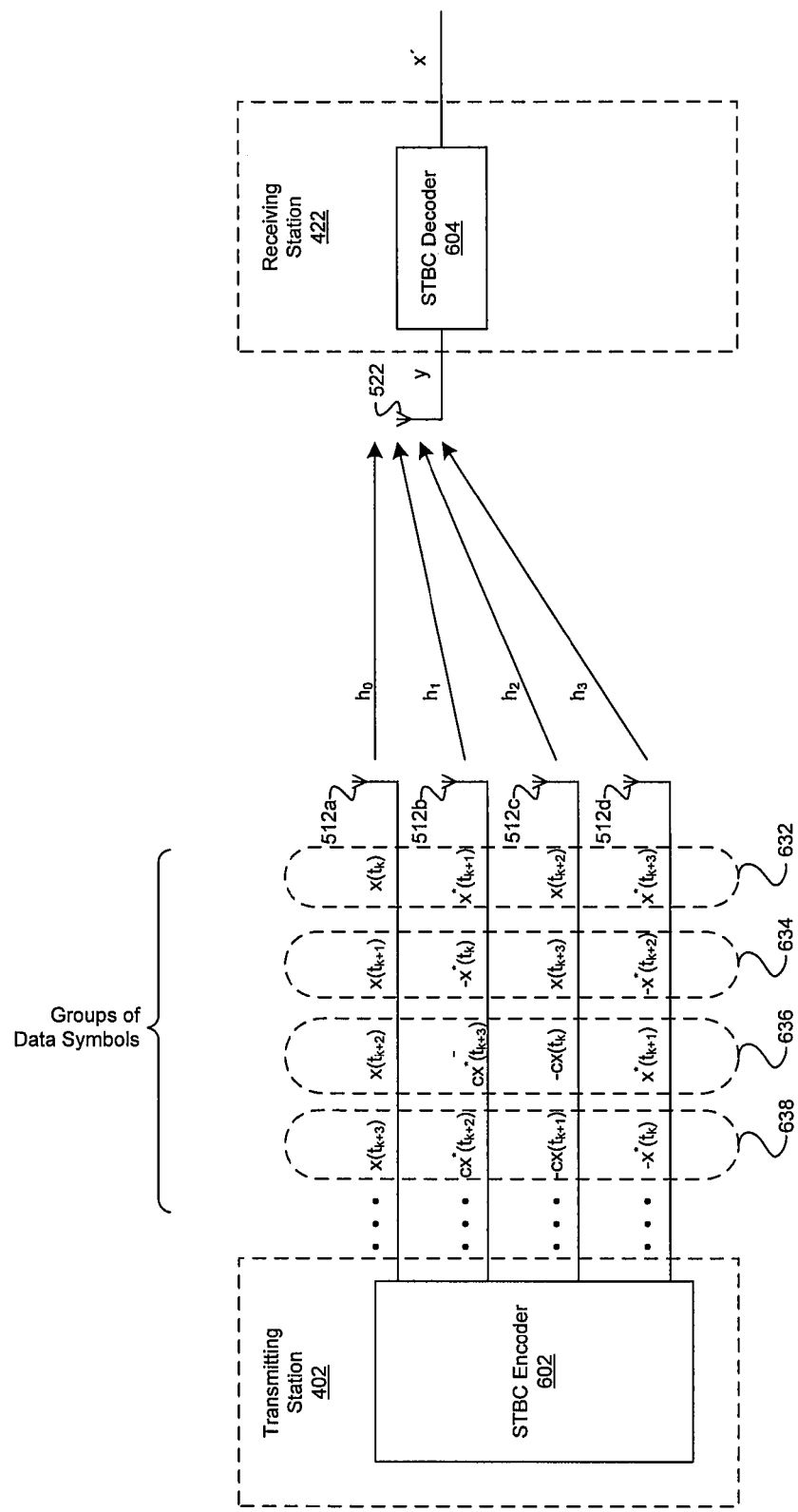
FIG. 5 is an exemplary block diagram of STBC with diversity transmission, in accordance with an embodiment of the invention.

FIG. 5 is an exemplary block diagram of STBC with diversity transmission, in accordance with an embodiment of the invention. Referring to FIG. 5, there is shown a transmitting station 402 and a receiving station 422. The transmitting station 402 may comprise an STBC encoder 602. The transmitting station 402 may utilize diversity transmission by simultaneously transmitting a plurality of RF output signals via at least a portion of the transmitting antennas 512a, 512b, 512c and 512d. The receiving station 422 may comprise an STBC decoder 604. The receiving station 422 may receive signals via a receiving antenna 522.

At successive time instants, the transmitting station 402 may utilize STBC to concurrently transmit groups of data symbols 632, 634, 636 and 638. In an exemplary embodiment of the invention, each of the individual data symbols $x(t_k)$ may comprise an OFDM symbol, which occurs within a spatial stream at a time instant $t_k$. Thus, in a 4×1 STBC diversity transmission system, a plurality of data symbols $x(t_k)$, $x(t_{k+1})$, $x(t_{k+2})$ and $x(t_{k+3})$, which occur within a single data stream at time instants $t_k$, $t_{k+1}$, $t_{k+2}$ and $t_{k+3}$, may be concurrently transmitted via the plurality of transmitting antennas 512a, 512b, 512c and 512d. When transmitting the group of data symbols 632, the transmitting station 402 may transmit a codeword $s(0,k)=x(t_k)$ via transmitting antenna 512a, and a codeword $s(1,k+1)=x^*(t_{k+1})$ via transmitting antenna 512b, where $x^*$ may refer to a complex conjugate of x. The transmitting station 402 may also transmit a codeword $s(2,k+2)=x(t_{k+2})$ via transmitting antenna 512c, and a codeword $s(3,k+3)=x^*(t_{k+3})$ via transmitting antenna 512d.

When transmitting the group of data symbols 634, the transmitting station 402 may transmit a codeword $s(0,k+1)=x(t_{k+1})$ via transmitting antenna 512a, and a codeword $s(1,k)=-x^*(t_k)$ via transmitting antenna 512b. The transmitting station 402 may also transmit a codeword $s(2,k+3)=x(t_{k+3})$ via transmitting antenna 512c, and a codeword $s(3,k+2)=-x^*(t_{k+2})$ via transmitting antenna 512d.

When transmitting the group of data symbols 636, the transmitting station 402 may transmit a codeword $s(0,k+2)=x(t_{k+2})$ via transmitting antenna 512a, and a codeword $s(1,k+3)=-c \cdot x^*(t_{k+3})$ via transmitting antenna 512b. The transmitting station 402 may also transmit a codeword s(2,k)=−c·x(t$_k$) via transmitting antenna 512c, and a codeword s(3,k+1)= x*(t$_{k+1}$) via transmitting antenna 512d. The variable c may refer to an angle rotation value as shown in the following equation:

$$c = e^{j\theta} \quad [3]$$

where θ may refer to an angle rotation value. In various embodiments of the invention, the receiving station 422 computes the value, c, in equation [3].

Signals traveling through the communication medium to the receiving station 422, which were transmitted via the transmitting antenna 512a, may be modified based on the transfer coefficient factor, h$_0$. Signals communicated via the transmitting antenna 512b over the transmission medium may be modified based on the transfer coefficient factor, h$_1$. Signals communicated via the transmitting antenna 512c over the transmission medium may be modified based on the transfer coefficient factor, h$_2$ and signals communicated via the transmitting antenna 512d over the transmission medium may be modified based on the transfer coefficient factor, h$_3$.

Quasi-orthogonal space time block coding (STBC) is a method utilized in some diversity transmission systems utilized in the field of wireless communication. The appeal of quasi-orthogonal STBC is that it seeks to enable wireless communication systems to utilize advantages of diversity transmission at a transmitting station, while allowing simplified decoding techniques at a receiving station.

In an exemplary embodiment of the invention, a channel estimate matrix H$_{new}$ may be computed based on the Hadamard product of the matrix H$_{eff}$ and a rotation matrix C as shown below:

$$\begin{bmatrix} h_0 & h_1 & h_2 & h_3 \\ h_1^* & -h_0^* & h_3^* & -h_2^* \\ h_2 & h_3 & h_0 & h_1 \\ h_3^* & -h_2^* & h_1^* & -h_0^* \end{bmatrix} \otimes \begin{bmatrix} 1 & 1 & 1 & 1 \\ 1 & 1 & 1 & 1 \\ c & 1 & 1 & c \\ 1 & c^* & c^* & 1 \end{bmatrix} = \begin{bmatrix} h_0 & h_1 & h_2 & h_3 \\ h_1^* & -h_0^* & h_3^* & -h_2^* \\ c \cdot h_2 & h_3 & h_0 & c \cdot h_1 \\ h_3^* & -c^* \cdot h_2^* & c^* \cdot h_1^* & -h_0^* \end{bmatrix} \quad [4]$$

where the first matrix on the left hand side of equation [4], H$_{eff}$, represents an effective channel estimate matrix for quasi-orthogonal STBC transmission, the second matrix on the left hand side of equation [4] is the rotation matrix C and the matrix on the right hand side of equation [4] is the matrix H$_{new}$. The matrix H$_{new}$ represents the effective channel estimate matrix when signals concurrently transmitted by the transmitting station 402 are rotated based on the rotation matrix C. In the rotation matrix, C, the matrix coefficient value, c, represents the angle rotation factor as shown in equation [3]. A crosstalk term δ, which is associated with quasi-orthogonal space-time coding, may be represented as shown in the following equation:

$$\delta = h_0^* \cdot h_2 + h_1 \cdot h_3^* + c^* \cdot (h_0^* \cdot h_2 + h_1 \cdot h_3^*)^* \quad [5]$$

In various embodiments of the invention, the value for c may be determined such that the crosstalk term δ≈0. The computed value for c which may meet this condition may be represented as shown in the following equation:

$$c = \exp(-j \cdot (2 \cdot \text{angle}(h_0^* \cdot h_2 + h_1 \cdot h_3^*) + \pi)) \quad [6]$$

The rotation angle value θ referred to in equation [3] may be represented as shown in the following equation:

$$\theta = 2 \cdot \text{angle}(h_0^* \cdot h_2 + h_1 \cdot h_3^*) \quad [7]$$

where:

$$a = h_0^* \cdot h_2 + h_1 \cdot h_3 \quad [8]$$

In an exemplary embodiment of the invention, the angle rotation factor, c, may be represented as a single bit value. For example:

$$\text{if } (|\text{Re}(h_0^* \cdot h_2 + h_1 \cdot h_3^*)| > |\text{Im}(h_0^* \cdot h_2 + h_1 \cdot h_3^*)|) \quad [9]$$
$$\begin{aligned} & c = 1; \quad /^* \theta = 0, \text{angle}(a) = 0 \, ^* / \\ \text{else } & c = -1; \quad /^* \theta = \pi, \text{angle}(a) = 1/2\pi \, ^* / \end{aligned}$$

In the exemplary embodiment of the invention presented in equation [9], the single bit representation of the angle rotation factor c enables the value of c to indicate two different angle rotation values: θ=0 and θ=π. In another exemplary embodiment of the invention, the angle rotation factor may be represented as a two-bit value. The two-bit representation of c enables the value of c to indicate four different angle rotation values. In various embodiments of the invention, the angle rotation factor c may be represented by an m-bit value, where m represents a selected number of bits.

In various embodiments of the invention, when the receiving station 422 is operating in a hybrid operating regime, the receiving station 422 may transmit a single bit value within feedback data to the transmitting station 402. The single bit value may represent the value for the angle rotation factor c. When the transmitting station 402 receives the single bit value within feedback data while operating in a hybrid operating regime, the transmitting station may transmit signals utilizing STC based on the received angle rotation factor c.

Various embodiments of the invention may be practiced when applying the concepts disclosed herein to enable a receiving station 422 to generate reduced quantity FI based on a detected Doppler shift frequency and/or based on a detected velocity. The reduced quantity FI may be transmitted within feedback data. In this regard, the receiving station 422 may transmit feedback data, which may be utilized for generating beamformed signals and/or space-time coded signals, for example. Based on received reduced quantity FI within feedback data, a transmitting station 402 may generate beamformed and/or space-time coded signals, for example.

Figure 6A:
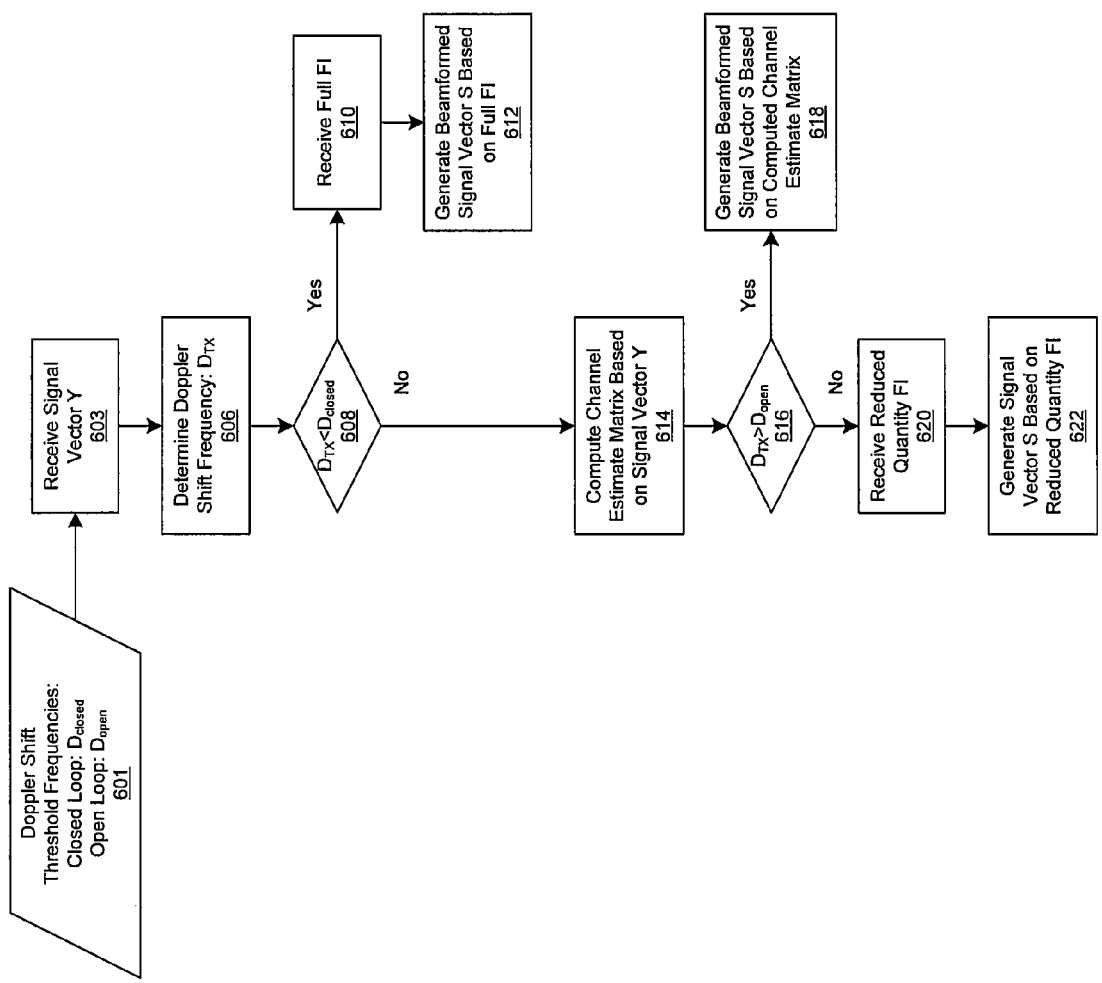
FIG. 6A is a flowchart that presents exemplary steps for operating regime adaptation at a transmitting station in a MIMO communication system, in accordance with an embodiment of the invention.

FIG. 6A is a flowchart that presents exemplary steps for operating regime adaptation at a transmitting station in a MIMO communication system, in accordance with an embodiment of the invention. In the exemplary embodiment of the invention, which is presented in FIG. 6A, the transmitting station transmits beamformed signals when operating in the open loop operating regime. Referring to FIG. 6A, in step 601, Doppler shift threshold frequency values may be established: D$_{closed}$ represents a threshold for the closed loop operating regime and D$_{open}$ represents a threshold for the open loop operating regime. In step 603, the transmitting station may receive a signal vector Y via an uplink RF channel. In step 606, the transmitting station may determine a Doppler shift frequency, D$_{TX}$, based on the received signal vector Y. In step 608, the transmitting station may determine whether D$_{TX}$ is less than the D$_{closed}$ threshold value. In instances in which D$_{TX}$<D$_{closed}$, in step 610, the transmitting station may receive full FI. In step 612, the transmitting station may generate beamformed signal vectors S based on the full FI. The signal vector S represents the set of signals that are concurrently transmitted by the transmitting station.

Returning to step 608, in instances in which $D_{TX} \geq D_{closed}$ in step 614, the transmitting station may compute a channel estimate matrix, H, based on the received signal vector Y. In step 616, the transmitting station may determine whether $D_{TX}$ is greater than the $D_{open}$ threshold value. In instances in which $D_{TX} > D_{open}$, in step 618, the transmitting station may generate signal vectors S based on the computed channel estimate matrix H.

Returning to step 616, in instances in which $D_{closed} \geq D_{TX} \geq D_{open}$, in step 620, the transmitting station may receive reduced quantity FI. In step 622, the transmitting station may generate signal vectors S based on the reduced quantity FI.

Figure 6B:
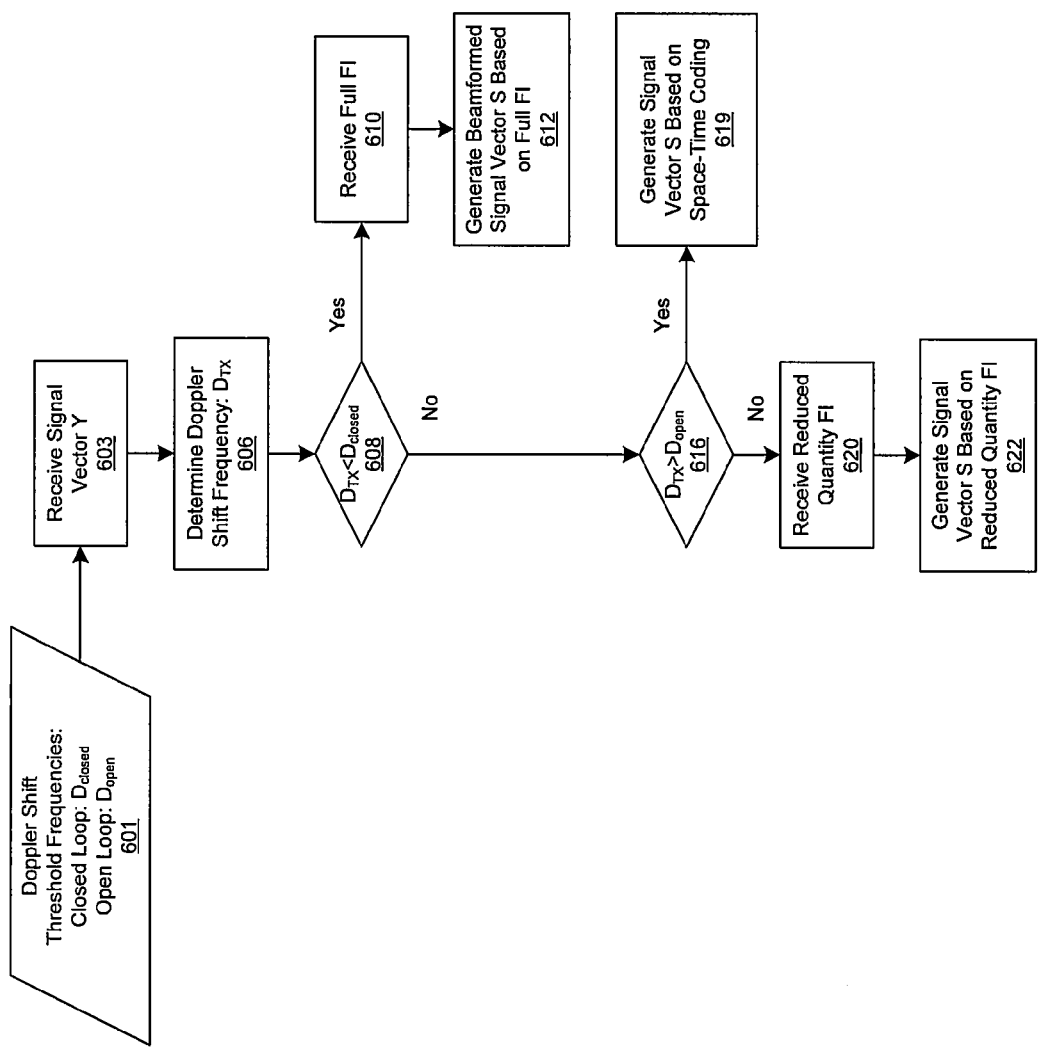
FIG. 6B is a flowchart that presents exemplary steps for operating regime adaptation at a transmitting station in a MIMO communication system, in accordance with an embodiment of the invention.

FIG. 6B is a flowchart that presents exemplary steps for operating regime adaptation at a transmitting station in a MIMO communication system, in accordance with an embodiment of the invention. In the exemplary embodiment of the invention, which is presented in FIG. 6B, the transmitting station transmits STC signals when operating in the open loop operating regime. Comparing FIG. 6A and FIG. 6B, in FIG. 6B, the step of computing a channel estimate matrix based on a received signal vector Y (FIG. 6A, step 614) is not shown. Instead, in FIG. 6B, step 616 follows step 608. In instances in which $D_{TX} > D_{open}$, in step 619, the transmitting station may generate signal vectors S based on STC.

Figure 7:
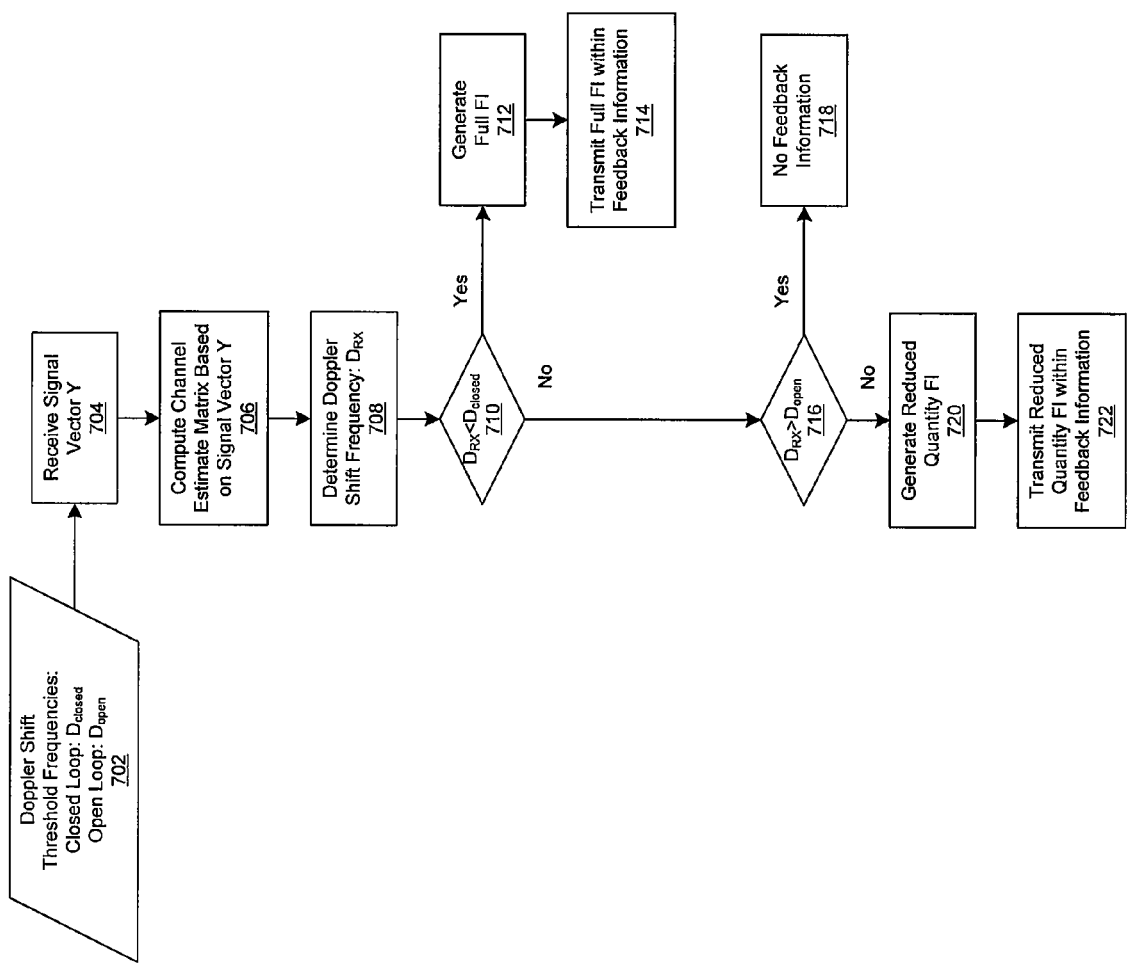
FIG. 7 is a flowchart that presents exemplary steps for operating regime adaptation at a receiving station in a MIMO communication system, in accordance with an embodiment of the invention.

FIG. 7 is a flowchart that presents exemplary steps for operating regime adaptation at a receiving station in a MIMO communication system, in accordance with an embodiment of the invention. Referring to FIG. 7, in step 702, Doppler shift threshold frequency values may be established: $D_{closed}$ represents a threshold for the closed loop operating regime and $D_{open}$ represents a threshold for the open loop operating regime. In step 704, the receiving station may receive a signal vector Y via a downlink RF channel. In step 706, the receiving station may compute a channel estimate matrix, H, based on the received signal vector Y. In step 708, the receiving station may determine a Doppler shift frequency, $D_{RX}$, based on the received signal vector Y. In step 710, the receiving station may determine whether $D_{RX}$ is less than the $D_{closed}$ threshold value. In instances in which $D_{RX} < D_{closed}$, in step 712, the receiving station may generate full FI based on the channel estimate matrix H. In step 714, the receiving station may transmit the full FI within feedback information via uplink RF channel.

Returning to step 710, in instances in which $D_{RX} \geq D_{closed}$, in step 716, the receiving station may determine whether $D_{RX}$ is greater than the $D_{open}$ threshold value. In instances in which $D_{RX} > D_{open}$, in step 718, no feedback information may be generated and/or transmitted.

Returning to step 716, in instances in which $D_{closed} \geq D_{RX} \geq D_{open}$, in step 720, the receiving station may generate reduced quantity FI. In step 722, the receiving station may transmit the reduced quantity FI via an uplink RF channel.

Aspects of a method and system for adaptation between different closed loop, open loop and hybrid techniques for multiple antenna systems may comprise a transmitting station 402 that enables generation of a plurality of signals that are concurrently transmitted via a communication medium based on a selected one of: full FI, reduced quantity FI or no feedback information. The selection may be determined at the transmitting station based on a determined Doppler shift frequency. The Doppler shift frequency may be determined based on signals received at the transmitting station 402 via the communication medium.

The transmitting station 402 may operate in a closed loop operating regime when the determined Doppler shift frequency is less than or equal to a closed loop operating regime threshold value. When the transmitting station 402 is operating in the closed loop operating regime, the transmitting station 402 may enable the generation of the plurality of concurrently transmitted signals based on full FI received within feedback information. A plurality of beamforming weights may be generated based on full FI. The transmitting station 402 may enable the generation of a beamformed plurality of concurrently transmitted signals based on the plurality of beamforming weights.

The transmitting station 402 may operate in a hybrid operating regime when the determined Doppler shift frequency is greater than or equal to a closed loop operating regime threshold value but less than or equal to an open loop operating regime threshold value. When the transmitting station 402 is operating in the hybrid operating regime, the transmitting station 402 may enable the generation of the plurality of concurrently transmitted signals based on the reduced quantity FI. The reduced quantity FI may be represented as a m-bit binary value. In an exemplary embodiment of the invention, the reduced quantity FI may be represented as a single bit value. An angle rotation value, θ, may be determined based on the binary value. The angle rotation value may be utilized to generate a plurality of transmitted signals based on space-time coding (STC), for example, STBC or SFBC.

The transmitting station 402 may operate in an open loop operating regime when the determined Doppler shift frequency is greater than an open loop operating regime threshold value. When the transmitting station 402 is operating in the open loop operating regime, the transmitting station 402 may enable the generation of the plurality of concurrently transmitted signals without utilizing feedback information. The transmitting station 402 may enable the computation of a channel estimate matrix based on signals received via the communication medium. The transmitting station 402 may enable the generation of the plurality of concurrently transmitted signals based on the computed channel estimate matrix and/or based on STC.

In an exemplary embodiment of the invention, the quantity of full FI, $D[FI_{Full}]$, may comprise floating point representations of CSI data (represented by a channel estimate matrix, H) and/or beamforming weights data (represented by a beamforming matrix, V).

In another exemplary embodiment of the invention, the quantity of reduced quantity FI, $D[FI_{Reduced}]$, may comprise quantized versions of the beamforming weights data in the beamforming matrix, V. The quantized version of the beamforming matrix, $V^Q$, may be a reduced quantity version of the beamforming matrix V such that $D[V^Q] < D[V]$.

In another exemplary embodiment of the invention, the quantity of reduced quantity FI, $D[FI_{Reduced}]$, may comprise data compressed versions of the beamforming weights data in the beamforming matrix, V. The data compressed version of the beamforming matrix, $V^{Cmp}$, may be a reduced quantity version of the beamforming matrix V such that $D[V^{Cmp}] < DM$.

In another exemplary embodiment of the invention, the quantity of reduced quantity FI, $D[FI_{Reduced}]$, may comprise beamforming weights data, which are selected from a codebook. The codebook may specify permitted values for each beamforming weight. The value of each beamforming weight may be selected from the set of permitted values specified in the codebook. The codebook generated version of the beamforming matrix, $V^{Cbk}$, may be a reduced quantity version of the beamforming matrix V such that $D[V^{Cbk}] < D[V]$.

In another exemplary embodiment of the invention, the quantity of reduced quantity FI, $D[FI_{Reduced}]$, may comprise a reduced quantity version of channel estimate data, H. The reduced quantity version of the beamforming matrix, $H^e$, may be a reduced quantity version of the channel estimate matrix H such that $D[H^e]<D[H]$.

Various embodiments of the invention may be practiced in MIMO communication systems in instances when the characteristics of the communication medium change dynamically. The transmitting station and/or receiving station may determine the extent of dynamic change in the communication medium by observing changes in the values for computed channel estimates and/or based on changes in the values of data contained with received feedback information observed over specified time intervals. For example, when the communication medium is characterized as comprising a slow fading channel environment, the transmitting station and receiving station may operate in the closed loop operating regime. When the communication medium is characterized as comprising a fast fading channel environment, the transmitting station and/or receiving station may operate in the open loop operating regime. When the communication medium is characterized as comprising neither a slow fading channel environment or a fast fading channel environment, the transmitting station and/or receiving station may operate in the hybrid operating regime.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for adaptation between different closed-loop, open-loop and hybrid techniques for multiple antenna systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
in a receiver:
determining to transmit channel estimation data at a first frequency based upon a Doppler shift frequency being less than or equal to a first threshold value;
determining to transmit the channel estimation data at a second frequency based upon the Doppler shift frequency being greater than the first threshold value and less than or equal to a second threshold value; and
determining to not transmit the channel estimation data based upon the Doppler shift frequency being greater than the second threshold value;
in a transmitter:
generating outgoing signals wherein:
outgoing beamformed signals are generated based on one of the first and the second frequency of the channel estimation data;
alternatively, based on the channel estimation data not being transmitted, outgoing signals are generated using one of space time block coding or space frequency block coding techniques; and
concurrently transmitting the outgoing signals via a communication medium utilizing a selected one of the beamforming or coding techniques.

2. The method according to claim 1, comprising determining said Doppler shift frequency based on signals received via said communication medium.

3. The method according to claim 1, comprising generating said beamformed signals based on a baseline quantity of feedback information when said determined Doppler shift frequency is less than or equal to a closed loop operating regime threshold value.

4. The method according to claim 3, comprising generating a plurality of beamforming factors based on said baseline quantity of feedback information.

5. The method according to claim 4, comprising generating said beamformed signals based on said plurality of beamforming factors.

6. The method according to claim 1, comprising generating said beamformed signals based on a reduced quantity version of a baseline quantity of feedback information when said determined Doppler shift frequency is one or both of: greater than or equal to a closed loop operating regime threshold value and less than or equal to an open loop operating regime threshold value.

7. The method according to claim 6, wherein said reduced quantity version of said baseline quantity of feedback information is a binary value, wherein said binary value comprises a determined number of bits.

8. The method according to claim 7, wherein said binary value is a single bit.

9. The method according to claim 7, comprising determining an angle rotation value based on said binary value.

10. The method according to claim 9, comprising generating said plurality of concurrently transmitted beamformed signals based on space-time coding and based on said determined angle rotation value.

11. The method according to claim 1, comprising generating said beamformed signals based on a no feedback information when said determined Doppler shift frequency is greater than or equal to an open loop operating regime threshold value.

12. The method according to claim 11, comprising computing a channel estimate matrix based on signals received via said communication medium.

13. The method according to claim 12, comprising generating said plurality of concurrently transmitted beamformed signals based on said computed channel estimate matrix.

14. The method according to claim 13, comprising generating said plurality of concurrently transmitted beamformed signals based on space-time coding.

15. A system for processing signals in a communication system, the system comprising:
one or more circuits for use in a transmitter, wherein said one or more circuits enable generation of a plurality of outgoing signals that are concurrently transmitted via a communication medium utilizing a selected one of: a baseline quantity of feedback information, a reduced quantity version of said baseline quantity of feedback information or no feedback information, wherein said selection is performed by said transmitter based on a determined Doppler shift frequency, wherein:
the outgoing signals are beamformed based upon a first Doppler frequency value; and
the outgoing signals are generated and transmitting using one of space time block coding or space frequency block coding techniques based upon a second Doppler frequency value wherein the second Doppler frequency value is greater than the first Doppler frequency value.

16. The system according to claim 15, wherein said one or more circuits enable determination of said Doppler shift frequency based on signals received via said communication medium.

17. The system according to claim 15, wherein said one or more circuits enable generation of said plurality of concurrently transmitted beamformed signals based on said baseline quantity of feedback information when said determined Doppler shift frequency is less than or equal to a closed loop operating regime threshold value.

18. The system according to claim 17, wherein said one or more circuits enable generation of a plurality of beamforming factors based on said baseline quantity of feedback information.

19. The system according to claim 18, wherein said one or more circuits enable generation of said plurality of concurrently transmitted beamformed signals based on said plurality of beamforming factors.

20. The system according to claim 15, wherein said one or more circuits enable generation of said plurality of concurrently transmitted beamformed signals based on said reduced quantity version of said baseline quantity of feedback information when said determined Doppler shift frequency is one or both of: greater than or equal to a closed loop operating regime threshold value and less than or equal to an open loop operating regime threshold value.

21. The system according to claim 20, wherein said reduced quantity version of said baseline quantity of feedback information is a binary value, wherein said binary value comprises a determined number of bits.

22. The system according to claim 21, wherein said binary value is a single bit.

23. The system according to claim 21, wherein said one or more circuits enable determination of an angle rotation value based on said binary value.

24. The system according to claim 23, wherein said one or more circuits enable generation of said plurality of concurrently transmitted beamformed signals based on space-time coding and based on said determined angle rotation value.

25. The system according to claim 15, wherein said one or more circuits enable generation of said plurality of concurrently transmitted beamformed signals based on said no feedback information when said determined Doppler shift frequency is greater than or equal to an open loop operating regime threshold value.

26. The system according to claim 25, wherein said one or more circuits enable computation of a channel estimate matrix based on signals received via said communication medium.

27. The system according to claim 26, wherein said one or more circuits enable generation of said plurality of concurrently transmitted beamformed signals based on said computed channel estimate matrix.

* * * * *